(12) United States Patent
Shah et al.

(10) Patent No.: US 11,734,068 B1
(45) Date of Patent: Aug. 22, 2023

(54) SYNCHRONIZATION SYSTEM BASED ON DYNAMIC DATA DEPENDENCY IN A FEDERATED FASHION TO REACH EVENTUAL CONSISTENCY

(71) Applicant: INTUIT INC., Mountain View, CA (US)

(72) Inventors: Samkeet Sanjay Shah, Mountain View, CA (US); Hao Chi Lieu, Mountain View, CA (US); Fangzhou Xu, Mountain View, CA (US); Ameen Radwan, Mountain View, CA (US); Abhishek Surendra Singh Dhabriya, Mountain View, CA (US); Omer Sheen Azmon, Mountain View, CA (US); Aditi Rajawat, Mountain View, CA (US); Ankith A. Aiyar, Mountain View, CA (US); Gennadiy Ziskind, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 17/935,461

(22) Filed: Sep. 26, 2022

(51) Int. Cl.
 *G06F 9/46* (2006.01)
 *G06F 9/50* (2006.01)
 *G06F 16/2455* (2019.01)

(52) U.S. Cl.
 CPC ........ *G06F 9/5005* (2013.01); *G06F 16/2455* (2019.01)

(58) Field of Classification Search
 CPC .......................... G06F 9/5005; G06F 16/2455
 See application file for complete search history.

*Primary Examiner* — Gregory A Kessler
(74) *Attorney, Agent, or Firm* — DLA Piper LLP (US)

(57) ABSTRACT

The disclosed system and methods are directed to a data-driven choreography of microservices sagas that enable the composition of microservices without depriving each individual microservice of its independence.

20 Claims, 4 Drawing Sheets

SYNCHRONIZATION SYSTEM BASED ON DYNAMIC DATA DEPENDENCY IN A FEDERATED FASHION TO REACH EVENTUAL CONSISTENCY

BACKGROUND

Microservice architecture is a unique method of developing software systems that are composed of loosely coupled small independent modules with well-defined interfaces and operations. Microservices solve the challenges known to plague monolithic systems (i.e., architectures with tightly coupled processes that run as a single service) by being as modular as possible. Microservices are often built for business objectives and each microservice typically performs a single independent function. Because microservices run independently, each microservice can be updated, deployed, and scaled to meet demand for specific functions of an application.

The composition of microservices is a three-sided market with four main personas (i.e., actors): users, consumers, microservice builders, and market makers. The users are the ultimate consumer of one or more compositions. The consumers are user interface or service builders that consume compositions. The microservice builders create and manage one or more microservices used in compositions. The market makers create a framework or platform on which the compositions take place. Each would like to perform its task rapidly and without having to wait or coordinate with others.

Independence is an important feature of microservice architecture that allows separate teams to work in parallel, and therefore develop and release microservices independently. Since the degree of possible parallelism is directly related to the independence of parallel tasks, independence is an important concern when designing a composition system for microservices.

Conventional approaches for addressing the issue of independence employ GraphQL, which allows each microservice to independently publish its piece of the data graph, and for the consumer to see a coherent whole. There are two popular techniques to provide a federated result when using GraphQL, which are GraphQL Federation and Schema Stitching. Both provide a technique that hides from the consumer the details of which microservice is providing a piece of data. They provide an effective means to compose and send queries to a microservices group.

These techniques work for queries because execution order is generally parallel. The consumer's queries are broken into a series of sub-queries, each directed to a different microservice. A sub-query that requires data from the results of another query is clearly defined by the field/fields identified for federation or stitching. No such solution is currently provided to compose mutation requests to a group of microservices. The most likely reasons why are that mutations may require: 1. beyond mere composition, a distributed transaction across the microservices in the group, 2. a more complicated execution order than all serial or all parallel execution, due to the more complicated interdependencies amongst the microservices, and or 3. more time than a synchronous transaction may afford in a computing environment.

Several solutions already exist to support composing mutations outside of GraphQL. The most commonly used solution is the Orchestration Saga pattern, whereby either the consumer of the microservices, or one of the microservices on its behalf, invoke the rest in the correct order. Its popularity is most likely due to the simplicity of implementation, but it does not afford much independence; that is, the orchestrator in effect becomes a new monolith. A change in one of the microservices, or the addition of a new microservice in the composition requires changing, at least, the orchestrating microservice.

The Choreography Saga design pattern attempts to address this shortcoming using an event-based approach whereby dependencies are resolved by dependent microservices listening for a completion event emitted by another member of the microservice group. This distribution of the transaction logic allows for a change in one or more of the microservices and the addition of new microservices without requiring any orchestrating microservices. One of the drawbacks of this solution is its increased difficulty in designing and understanding the transaction(s) performed by the system. Another drawback is that this solution requires a change in the composition, which would further require a change in the choreography code and/or the topics one or more services listen to.

Moreover, there are no solutions that address the variability and multi-team independence problem, without changing the backend code of the microservices or their frameworks each time a new variant composition was added, whether due to a new microservice being added to the group, or a new composition requirement from the group's consumer. As such, there is a need for a solution that addresses the variability and multi-team independence problems, and simultaneously provides the ability to rapidly add new variants, and the ability to easily maintain the code.

SUMMARY

Conventionally, the composition of microservices to form transactions is performed using a two-phase-commit pattern or a saga pattern. Most conventional approaches choose the saga pattern to improve performance and drive the composition using an orchestration or choreography workflow. However, when high variability in compositions is required by the consumer of the microservices, a new or changed workflow must be developed that impacts all the microservices within a framework, thereby depriving each microservice of its independence, which is undesirable.

The disclosed system and methods provide a solution that enables the composition of microservices without depriving each individual microservice of its independence. In one respect, this solution involves federated mutation based on a data query and manipulation schema and a message bus. This solution further involves creating data-driven dependencies by replacing any map, list, or scalar of the subgraph, with a reference link instead of the actual value. In one or more embodiments, the reference link may be a single key-value pair, and the reference link key-value pair may adhere to a syntax such that the key is represented by an '@' symbol followed by an event processor name, and the value is represented by a JSON (JavaScript Object Notation) path to an element in a status event emitted by that event processor. Resolution occurs when the value from the status event replaces the reference link.

The aforementioned solution is provided by implementing a data-driven choreography of microservice sagas. This approach assumes that for a given environment that: each microservice is loosely coupled to one another in a federated fashion, each microservice publishes its mutation parameters as part of a supergraph, each mutation request using the supergraph is copied onto a federated topic of a message bus, each microservice reports its success on a status topic, and that the status topic includes any data being exported by that microservice for consumption by other microservices. Like any composition of microservices' mutations, they must be either fully independent from each other (i.e., not form a transaction) or conform to the principals of a distributed transaction. In the case of a distributed transaction, the saga rules apply, such that the individual microservices' mutations are idempotent and should either allow for compensating transactions or support forward recovery.

The disclosed system and methods provide novel techniques for overcoming the deficiencies of conventional systems by implementing a data driven choreography event-based approach whereby dependencies are resolved by dependent microservices listening for a completion event emitted by another member of the microservice group. This distribution of the transaction logic allows for a change in one or more of the microservices and the addition of new microservices without requiring any orchestrating microservices.

In addition, this approach provides improvements over prior systems and methods by maintaining the illusion of a supergraph, supporting high variability, allowing microservice composers to have control of what is updated, enabling independence among microservices and the microservice builders, and increasing development speed.

DETAILED DESCRIPTION OF SEVERAL EMBODIMENTS

Embodiments of the present disclosure relate to systems and methods for a data driven choreography of microservice sagas. The implementation of these novel concepts may include, in one respect, an algorithmic pattern for creating a choreography that supports high composition variability without increasing code complexity, a data query and manipulation language for APIs (e.g., GraphQL), a distributed event store and stream-processing platform (e.g., Kafka), a microservice framework, and a microservice framework code library (e.g., Spring Boot) that encapsulates the code required to support and perform a saga and further enables microservice developers to focus on their business logic. The implementation of these novel concepts results in a computing environment with microservice independence, wherein separate teams are enabled to work in parallel, and therefore release microservice mutations independently.

Figure 1:
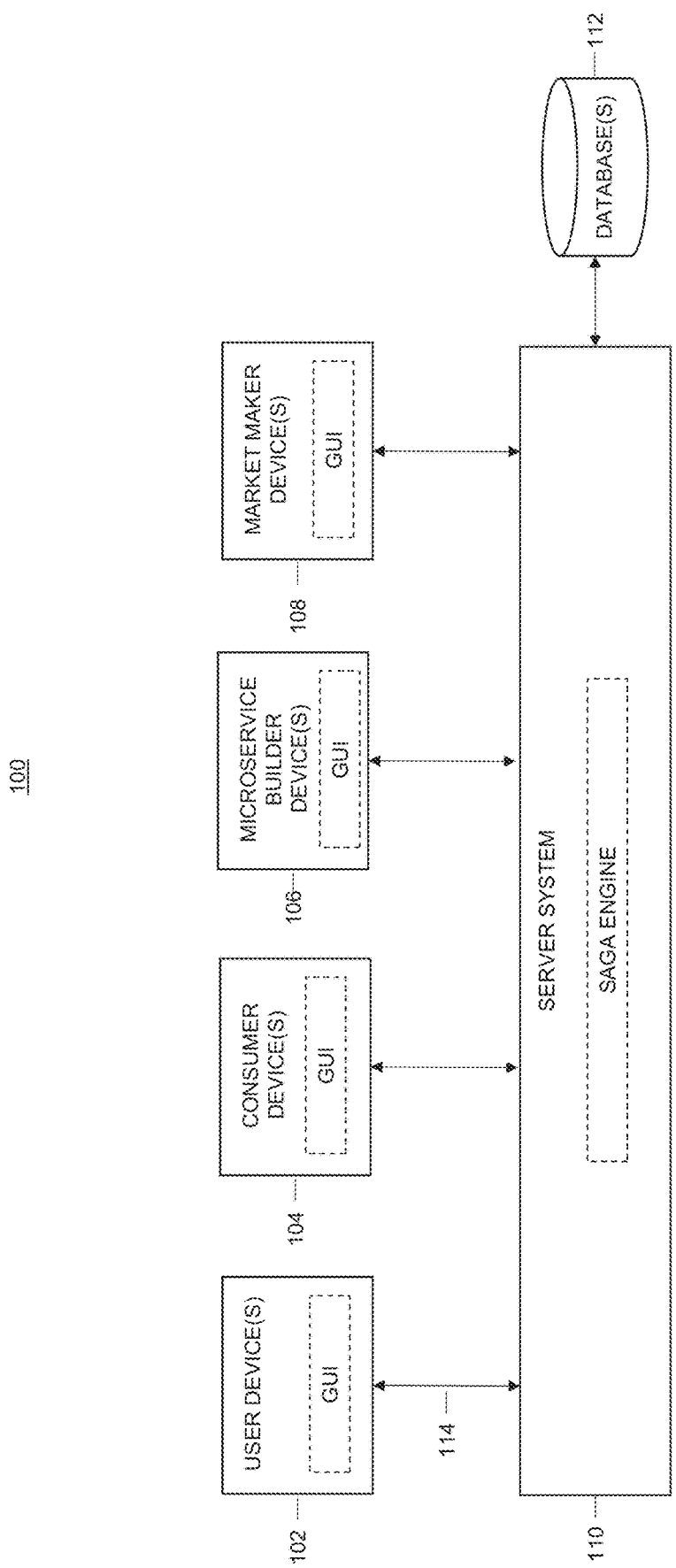
FIG. 1 illustrates a computing environment according to various embodiments of the present disclosure.

Referring to FIG. 1, computing environment 100 can be configured to implement a data-driven choreographed saga according to one or more embodiments of the present disclosure. Computing environment 100 may include one or more user device(s) 102, consumer device(s) 104, microservice builder device(s) 106, market maker device(s) 108, and one or more databases 112, communicatively coupled to server system 110, and further configured to communicate through network 114.

In one or more embodiments, user device(s) 102, consumer device(s) 104, microservice builder device(s) 106, and market maker device(s) 108, are operated by a user. User device(s) 102, consumer device(s) 104, microservice builder device(s) 106, and market maker device(s) 108 may be representative of a mobile device, a tablet, a desktop computer, or any computing system having the capabilities described herein. Users may include, but are not limited to, the ultimate consumer of one or more compositions. Consumers are UI or service builders that consume compositions. The microservice builders create and manage one or more microservices used in compositions. The market makers create a framework or platform on which the compositions take place. Notably, each would like to perform its task rapidly and without having to wait or coordinate with others.

In one or more embodiments, user device(s) 102, consumer device(s) 104, microservice builder device(s) 106, and market maker device(s) 108, are operated by a user under the supervision of the entity hosting and/or managing server system 110. Users of user device(s) 102, consumer device(s) 104, microservice builder device(s) 106, and market maker device(s) 108, include, but are not limited to, individuals such as, for example, software engineers, database administrators, employees, and/or customer service agents, of an entity associated with server system 110.

User device(s) 102, consumer device(s) 104, microservice builder device(s) 106, and market maker device(s) 108, according to the present disclosure may include, without limitation, any combination of mobile phones, smart phones, tablet computers, laptop computers, desktop computers, server computers or any other computing device configured to capture, receive, store and/or disseminate any suitable data. In one embodiment, a user device(s) 102 includes a non-transitory computer readable medium (e.g., non-transitory memory) including machine readable instructions, one or more processors for executing the instructions, a communications interface that may be used to communicate with server system 110, (and, in some examples, with the database(s) 112), a user input interface for inputting data and/or information to the user device and/or a user display interface for presenting data and/or information on the user device. In some embodiments, the user input interface and the user display interface are configured as an interactive graphical user interface (GUI). These devices are also configured to provide server system 110, via the interactive GUI, with input information for further processing. In some examples, the user input interface and the user display interface are configured as an interactive GUI. These devices are also configured to provide server system 110, via the interactive GUI, input information (e.g., queries, questions, prompts, commands, and code) for further processing. In some embodiments, the interactive GUI is hosted by server system 110 or it can be provided via a client application operating on the user device.

Server system 110 hosts, stores, and operates a saga engine, or the like, for implementing a data driven choreography saga(s) associated with the one or more underlying microservices supported by system 110. For example, if server system 110 supports or one or more microservice(s), it will include the capability to manage and facilitate federated mutation requests that allow each microservice's development team to work in parallel and simultaneously independently release microservice mutations. The microservices hosted by server system 110 may be architecturally structured in a federated fashion, which enables a group of microservices to present and provide a unified seamless front to the consumers while maintaining independence between members.

The saga engine may, among other tasks, emit the initial event that begins a composition request, and continually monitor the fulfillment of the composition request until completion. As such, the saga engine monitors all events related to a composition request to determine the state of each transaction (i.e., a required task associated with the composition request), for example, whether the transaction is in-progress, failed, or completed. The saga manager may also enable certain transactions to be scheduled, such that it enables a microservice framework to accommodate business logic that requires a very long (e.g., up to 24 hours) wait time to implemented, by scheduling the transaction to be requeued for execution. This is an improvement over conventional methods, which require each microservice to monitor its descendants (i.e., those microservices that depend on the microservice that is being modified) for failures.

In one or more embodiments, and in furtherance of implementing a composition request, server system 110 is configured to maintain a microservice network and publish each microservice's sub-graph schema throughout the microservice framework, such that server system 110 can determine at which point each microservice is attached to a supergraph relative to one another. In response to receiving a composition request, server system 110 may be configured to initiate a saga by broadcasting a federated mutation request. Server system 110 may use the knowledge of the published sub-schema to extract the sub-graph(s) of the microservice(s) that are to be modified. Server system 110 may be configured to receive event status updates, such that it is aware of whether a transaction has been completed, in progress, or has failed. In response to receive event status updates, server system 110 creates data-driven dependencies, whereby a reference link that replaces any map, list, or scalar of the sub-graph, is generated. Server system 110 may be further configured to resolve any dependencies by replacing the reference link with a value associated with the status event. Server system 110 may be configured to emit the status of the event on the status event bus and then terminate the saga.

Server system 110 may be further configured to implement two-factor authentication, Secure Sockets Layer (SSL) protocols for encrypted communication sessions, biometric authentication, and token-based authentication. Server system 110 may include one or more processors, servers, databases, communication/traffic routers, non-transitory memory, modules, and or interface components.

Database(s) 112 may be locally managed and/or a cloud-based collection of organized data stored across one or more storage devices and may be complex and developed using one or more design schema and modeling techniques. In one or more embodiments, the database system may be hosted at one or more data centers operated by a cloud computing service provider. Database(s) 112 may be geographically proximal to or remote from server system 110 configured for data dictionary management, data storage management, multi-user access control, data integrity, backup and recovery management, database access language application programming interface (API) management, and the like. Database(s) 112 are in communication with server system 110 and user device(s) 102, consumer device(s) 104, microservice builder device(s) 106, market maker device(s) 108, via network 114. Database(s) 112 store various data, including one or more supergraphs, sub-graphs, event data, and event status data. Database(s) 112 may be deployed and maintained automatically by one or more components shown in FIG. 1.

Network 114 is any suitable network, including individual connections via the Internet, such as cellular or Wi-Fi networks. In some embodiments, network 114 connects terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, LAN, or the Internet. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

For example, network 114 may be the Internet, a private data network, virtual private network using a public network and/or other suitable connection(s) that enables components in computing environment 100 to send and receive information between the components of computing environment 100.

Figure 2:
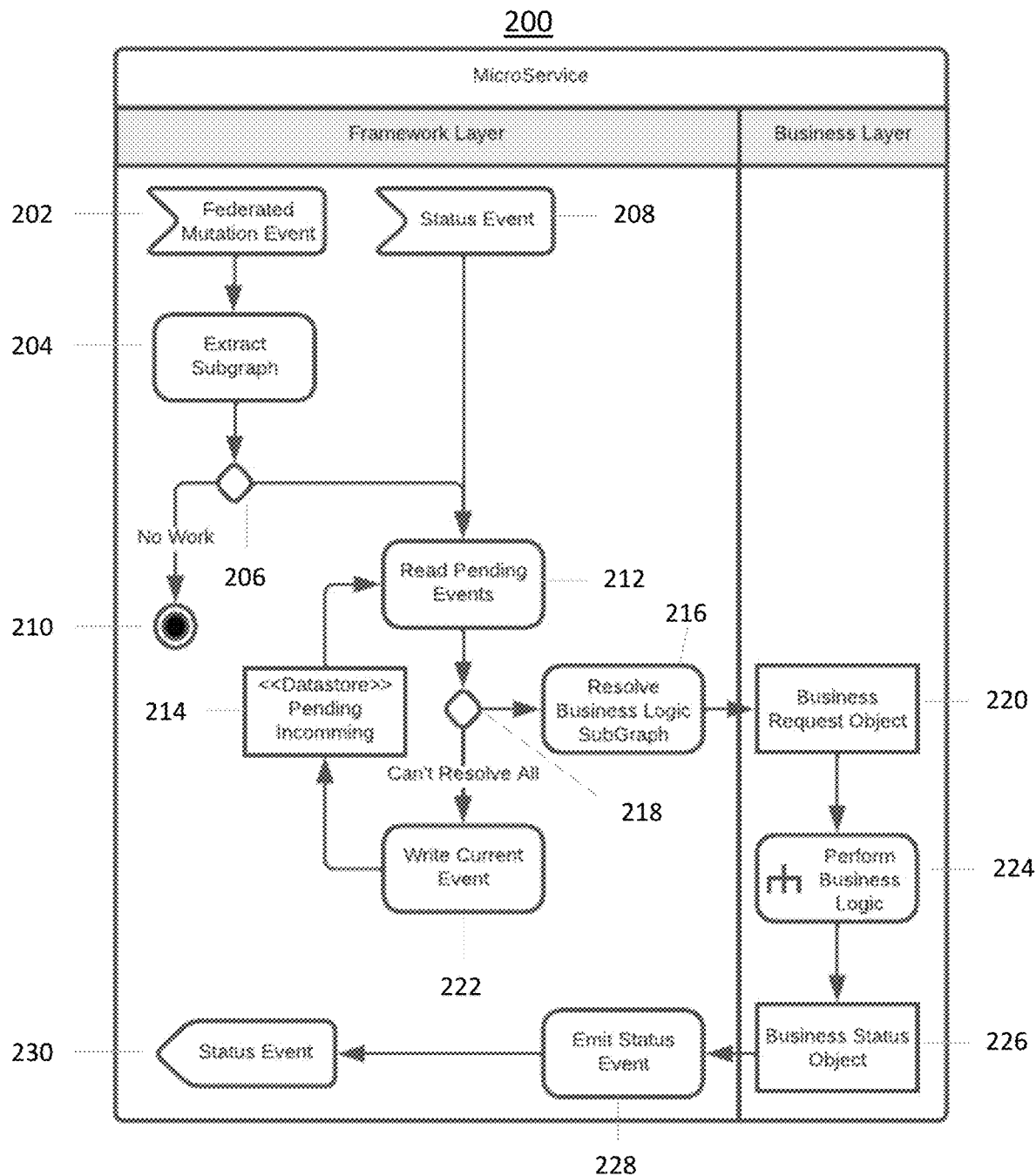
FIG. 2 illustrates a microservice framework process according to various embodiments of the present disclosure.

Referring to FIG. 2, an example microservice framework process 200 is depicted, according to various embodiments of the present disclosure. As depicted, upon receipt of a composition request, one or more components (e.g., server system 110) in computing environment 100 may initiate a saga for implementing one or more transactions that are to be completed to satisfy the composition request. At 202, a federated mutation event is received and associated with the composition request. At 204, the sub-graph associated with the microservice that initiated the composition request is extracted from a supergraph. At 206, a determination is made as to whether a sub-graph exists for the microservice associated with the composition request. If it is determined that no sub-graph exists, and the process 200 continues at 210, where no work is performed. However, upon determining that a sub-graph does exist for the microservice (at 206), the process continues at 212 where pending events are read from a data store 214 (e.g., database(s) 112) that may have previously stored events that were placed in queue to be processed at a later attempt. Notably, at 208, a status event associated with one or more events may be transmitted. In addition, or alternatively, it may be determined at 218 that a current event should be written at 222 for subsequent storage and processing when it cannot be resolved. Alternatively, it may be determined at 218 that business logic associated with the extracted sub-graph needs to be resolved at 216, whereby dependencies are resolved by dependent microservices listening for a completion event emitted by another member of the micro service group. Once dependencies are resolved, the composition request may be passed to the business layer to business request object 220 that is configured to facilitate the transport of data between the framework and business logic layers. At 224, the business logic may be idempotently executed and saved to a data store (e.g., database(s) 112), wherein a business status object 226 is updated to indicate the status of the executed business logic, for example if it was a success or a failure. At 228, the status of the event is transmitted on the status event bus for downstream use by one or more components. At 230, the microservice that initiated the composition request listens for the status events that was transmitted at 228 to determine whether all transactions were successful or if there were any failures reported.

Figure 3:
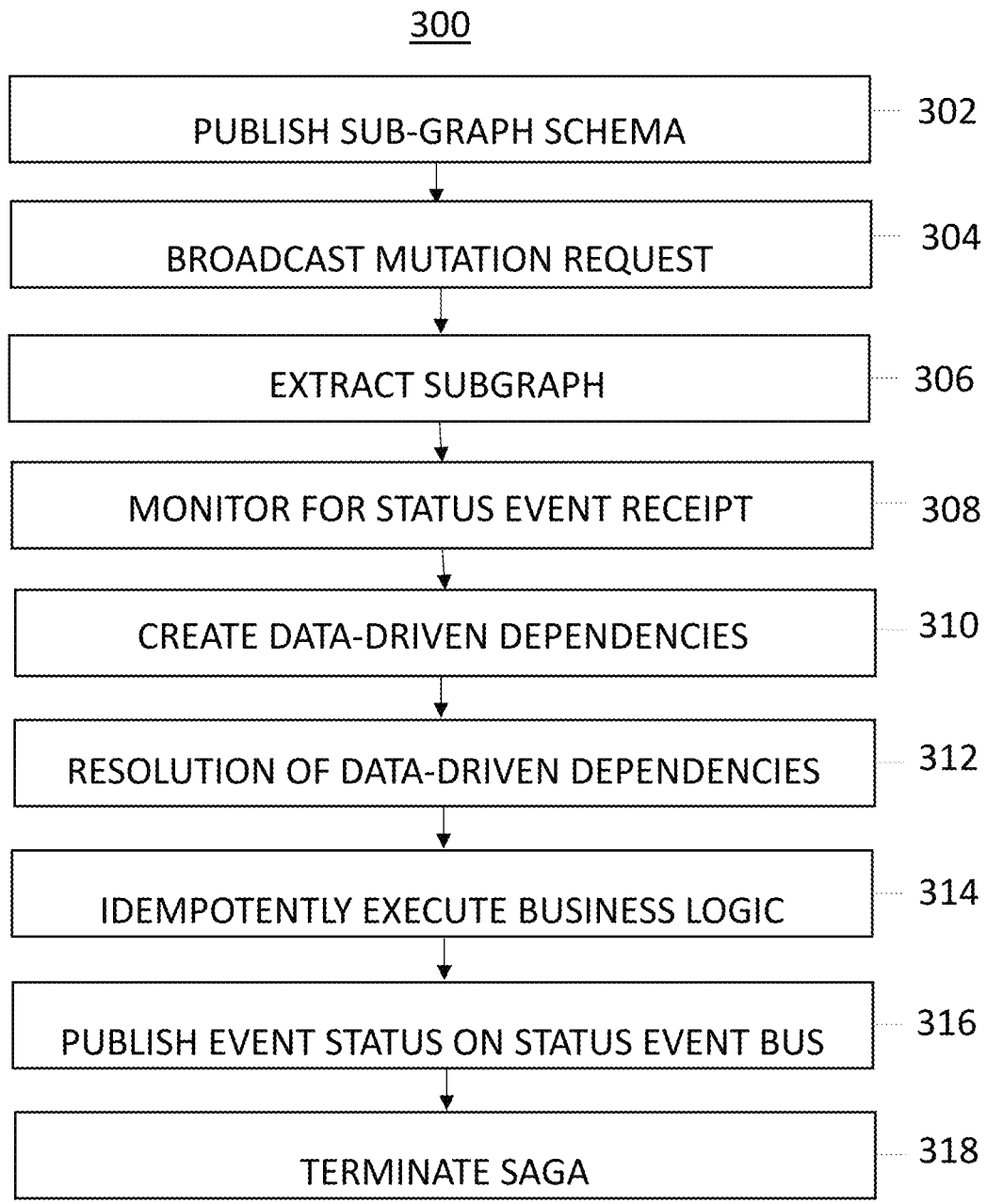
FIG. 3 illustrates a method for implementing a data-driven choreography saga according to various embodiments of the present disclosure.

Referring to FIG. 3, a method 300 for implementing a data-driven choreography saga, according to various embodiments of the present disclosure. In one respect, method 300 is a data-driven choreography saga that allows composers to independently determine what microservices can be mutated on an individual basis. As such, method 300 provides an improvement over conventional approaches at least because it enables developmental speed on a microservice framework and further allows for independence amongst microservices and composers.

Method 300 may be implemented in a computing environment 100 that hosts and operates a microservice framework, a microservice framework code library (e.g., Spring Boot), a data query and manipulation language for APIs (e.g., GraphQL), and a distributed event store and stream-processing platform (e.g., Kafka). Method 300 may interact with a supergraph, which in some embodiments is a unified API layer built with a declarative, modular GraphQL architecture. The supergraph may be composed of smaller graphs called sub-graphs, each with their own schema. Method 300 may be implemented and managed by a saga engine (e.g., saga engine operating on server system 110).

At 302, a microservice(s) publishes its sub-graph schema along with its mutation parameters to a supergraph. For example, one or more microservice(s) may be interconnected via the supergraph. Each microservice may publish its own parameters and define its criteria related to queries for requests, queries for statuses, and saving mutations according to specific data formats. The one or more microservice(s) may publish their sub-graph and parameters to a supergraph via one or more components in computing environment 100 (e.g., a saga engine operating on server system 110). The one or more microservice(s) may publish their sub-graph automatically on a periodic basis or in response to certain triggers, for example in furtherance of submitting a composition request (i.e., an event that initiates a mutation of one or more microservice(s)). As such, at 302, at least one microservice may publish its sub-graph in response to a composition request.

At 304, a saga engine operating on server system 110 may broadcast a composition request (i.e., a mutation request) thereby initiating a saga. In this instance, a saga may be a sequence of transactions that updates one or more microservices and publishes a message or event to trigger the next transaction step. If a step fails, the saga executes compensating transactions that counteract the preceding transactions. As such, at 304, the microservice that broadcasted the mutation request may broadcast a federated mutation event on microservice framework federated mutation event bus. In one embodiment, the consumer that desires to invoke a composition of a microservice is using a GraphQL client to issue a mutation. By design, therefore, the user does not have direct access to the message bus used to implement the solution described above. Instead, the microservice that implements the mutation acts as a proxy for the user. The microservice initiates the saga by copying the GraphQL mutation request to the federation message bus.

In some embodiments the saga engine may initiate a fail request validation prior to initiation the saga. In one or more embodiments, the full supergraph is copied to the message bus with an event header: validation only. Each microservice extracts its sub-graph and performs validation on it and responds rapidly with a list of violations. As discussed below for 308, the user proxy microservice monitors the bus for the responses, and upon failure or after a short time, responds to the GraphQL mutation request with the violations or success. The actual initiation is asynchronous. This validation feature is also exposed directly to the GraphQL client as an operation separate from the mutation to allow a user interface to receive a quick check on user input.

At 306, the saga engine extracts the sub-graph associated with the microservice that initiated the request. In one or more embodiments, the microservice framework may receive the federated mutation event via the federated mutation event bus. The saga engine may use the sub-graph schema associated with the requesting microservice to extract the sub-graph. In one or more embodiments, the saga engine may determine whether a sub-graph exists for the microservice. In the event that a sub-graph does not exist, the saga engine determines that no work is to be performed. However, in the event that a sub-graph does exist and can be extracted for the microservice, the saga engine implements a process for dependency resolution.

At 308, the saga engine monitors for a status event receipt. In one or more embodiments, each microservice may receive the composition request, and the saga engine may monitor transactions as to their status (e.g., whether the transaction was successful or unsuccessful) via received status event receipts and act accordingly. When a transaction starts, as indicated by a federated mutation event, the saga engine stores the event in its data store.

At 310, data-driven dependencies are created by replacing one or more values of a sub-graph (e.g., any map, list, or scalar of the sub-graph), with a reference link instead of the actual value. This indicates to the framework layer that it may not pass the request to the business layer until the reference is resolved. Every event, federated mutation, and status, either (1) brings about resolution of a transaction request or (2) is stored in the pending incoming datastore to be used in a later attempt. In one or more embodiments, the reference link is a single key-value pair with the key being the '@' symbol followed by an event processor name and the value is a query expression (e.g., a JSON) path to the element in the status event of that processor. The value is used to replace the reference link and thereby provides resolution. Notably, each event may have a unique supergraph transaction identifier. In one or more downstream processes, the unique supergraph transaction identifier is used by the saga engine to identify and match events.

At 312, saga engine resolves the data-driven dependencies. In one or more embodiments, the saga engine may locate the federated mutation and related status events using each event unique supergraph transaction identifier (e.g., a global transaction UID). Once the federated mutation and related status events are identified, the saga engine may attempt to resolve the reference links, as discussed above in reference to 310. Accordingly, for each reference link, the reference object is replaced by a value. In the event of a successful execution, wherein for a given dependency the reference object is replaced by a value, the result of this successful execution is the ordering among the participating microservices, just as a workflow would, but without the need for any explicit workflow logic or wait-loops. In addition, upon successful execution, the saga engine may pass the event to the business logic as discussed in reference to 216 and 220 for process 200. However, when a resolution of a reference link failure occurs for a given dependency, the transaction never emits its success status event, and saga engine returns the pending events associated with this transaction to a datastore (e.g., database(s) 112) as a pending incoming event, as discussed in reference to 214. Once the pending events are returned to a datastore (e.g., database(s) 112), a cleanup process cleans these out once a predetermined wait period (e.g., a max time limit) is reached.

At 314, the saga engine idempotently executes the business logic. In one or more embodiments, the saga engine may transfer the transaction from a framework layer to a business layer, wherein business logic or domain logic is executed in furtherance of the composition request. Once the business logic is implemented, a status (i.e., an indication as to whether the implementation was a success or failure) of the implementation is stored in a data store (e.g., a local data store). In response to storing the status, the status is returned to the framework layer.

At 316, in response to receiving the status of the business logic implementation from the business layer, the framework layer publishes the event status on the status event bus.

At 318, the saga engine terminates the saga. In one or more embodiments, the microservice that initiated the composition request will listen (i.e., monitor the framework layer for an indication) for status events. The microservice may receive the status events in a series of batches grouped by their respective unique supergraph transaction identifier and store them in the datastore (e.g., database(s) 112) on the framework layer. In response to receiving a successful event for a given transaction, the saga engine marks the transaction as complete and emits a transaction success event on the status topic. If any failure event occurs, the transaction is marked failed and emits a transaction failure event on the status topic. Any further events on a terminated transaction (success or failure) are silently ignored.

In at least one embodiment, in response to the transaction success and failure status events, the saga engine is configured to perform one or more of the following actions: send an email, post a slack message, and/or perform a HTTPS callback notification. In the event of a failure, the saga engine may enable an operator to fix the issue (e.g., an environmental issue) that caused the failure and retry the transaction. In the instance that an affected microservice report a successful event, the saga engine may log that particular event as a success and transmit a transaction success event. In the instance that a failure is reported, the saga may log that particular transaction as filed, optionally issue a compensating transaction, and transmit transaction failure event.

Figure 4:
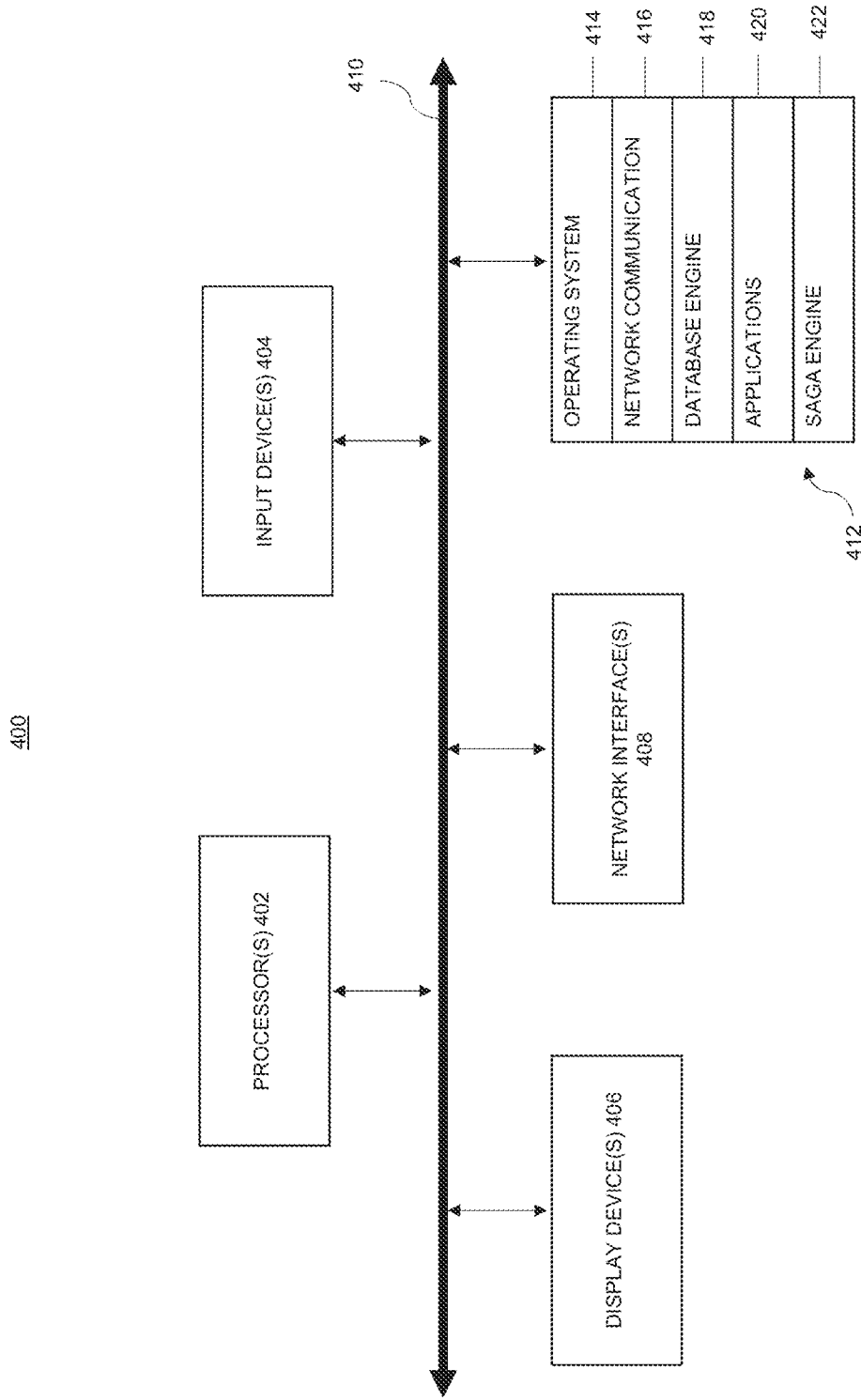
FIG. 4 illustrates a block diagram for a computing device according to various embodiments of the present disclosure.

FIG. 4 illustrates a block diagram for a computing device, according to various embodiments of the present disclosure. For example, computing device 400 may function as server system 110. The computing device 400 may be implemented on any electronic device that runs software applications derived from compiled instructions, including without limitation personal computers, servers, smart phones, media players, electronic tablets, game consoles, email devices, etc. In some implementations, the computing device 400 may include processor(s) 402, (one or more) input device(s) 404, one or more display device(s) 406, one or more network interfaces 408, and one or more computer-readable medium(s) 412 storing software instructions. Each of these components may be coupled by bus 410, and in some embodiments, these components may be distributed among multiple physical locations and coupled by a network 114.

Display device(s) 406 may be any known display technology, including but not limited to display devices using Liquid Crystal Display (LCD) or Light Emitting Diode (LED) technology. Processor(s) 402 may use any known processor technology, including but not limited to graphics processors and multi-core processors. Input device(s) 404 may be any known input device technology, including but not limited to a keyboard (including a virtual keyboard), mouse, track ball, camera, and touch-sensitive pad or display. Bus 410 may be any known internal or external bus technology, including but not limited to ISA, EISA, PCI, PCI Express, USB, Serial ATA or FireWire. Computer-readable medium(s) 412 may be any non-transitory medium that participates in providing instructions to processor(s) 402 for execution, including without limitation, non-volatile storage media (e.g., optical disks, magnetic disks, flash drives, etc.), or volatile media (e.g., SDRAM, ROM, etc.).

Computer-readable medium(s) 412 may include various instructions for implementing an operating system 414 (e.g., Mac OS®, Windows®, Linux). The operating system may be multi-user, multiprocessing, multitasking, multithreading, real-time, and the like. The operating system may perform basic tasks, including but not limited to: recognizing input from input device(s) 404; sending output to display device(s) 406; keeping track of files and directories on computer-readable medium(s) 412; controlling peripheral devices (e.g., disk drives, printers, etc.) which can be controlled directly or through an I/O controller; and managing traffic on bus 410. Network communications instructions 416 may establish and maintain network connections (e.g., software for implementing communication protocols, such as TCP/IP, HTTP, Ethernet, telephony, etc.).

Database processing engine 418 may include instructions that enable computing device 400 to implement one or more methods as described herein. Application(s) 420 may be an application that uses or implements the processes described herein and/or other processes. The processes may also be implemented in operating system 414. For example, application(s) 420 and/or operating system 414 may execute one or more operations to intelligently process documents (i.e., tax notices) via one or more natural language processing and/or machine learning algorithms.

Saga engine 422 may be used in conjunction with one or more methods as described above. Composition requests (e.g., federated mutation messages) received at computing device 400 may be fed into saga engine 422 to implement one or more data-driven choreography of microservices sagas.

The described features may be implemented in one or more computer programs that may be executable on a programmable system including at least one programmable processor coupled to receive data and instructions from, and to transmit data and instructions to a data storage system (e.g., database(s) 112), at least one input device, and at least one output device. A computer program is a set of instructions that can be used, directly or indirectly, in a computer to perform a certain activity or bring about a certain result. A computer program may be written in any form of programming language (e.g., Janusgraph, Gremlin, Sandbox, SQL, Objective-C, Java, JSON, GraphQL), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random-access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

It is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

What is claimed is:

1. A system comprising:
    a server comprising one or more processors; and
    a non-transitory memory, in communication with the server, storing instructions that when executed by the one or more processors, causes the one or more processors to implement a method comprising:
        responsive to receiving a microservice composition request from a requesting microservice:
            publishing a sub-graph schema on a microservice framework;
            broadcasting a federated mutation request on the microservice framework to one or more microservices;
            extracting a sub-graph associated with the requesting microservice;
            creating one or more data-driven dependencies by replacing one or more values of the sub-graph with a reference link;
            resolving the one or more data-driven dependencies, the resolving comprising replacing the reference link with new values from the status events and idempotently executing business logic ;
        publishing a business logic event status on the microservice framework in response to idempotently executing business logic.

2. The system of claim 1, wherein the reference link is a single key-value pair, and the single key-value pair adheres to a syntax such that a key is represented by a symbol followed by an event processor name, and a value is represented by a JSON path to an element in a status event associated with an independent microservice.

3. The system of claim 1, wherein publishing the sub-graph schema further comprises publishing parameter requirements associated with the requesting microservice.

4. The system of claim 1, further comprising monitoring the microservice framework for status event receipts associated with status events of the one or more microservices.

5. The system of claim 1, wherein extracting the sub-graph, further comprises extracting the sub-graph from a supergraph with including additional sub-graphs associated with the one or more independent microservices.

6. The system of claim 1, wherein resolving the one or more data-driven dependencies further comprises using a unique supergraph transaction identifier to locate events associated with the federated mutation request on the microservice framework.

7. The system of claim 1, wherein idempotently executing business logic further comprises transmitting a transaction associated with the federated mutation request from the microservice framework to an idempotent business layer.

8. The system of claim 1, wherein the one or more independent microservices each extract their corresponding sub-graphs in response to receiving the broadcasted federated mutation request.

9. A computer-implemented method comprising:
responsive to receiving a microservice composition request from a requesting microservice:
publishing a sub-graph schema on a microservice framework;
broadcasting a federated mutation request on the microservice framework to one or more microservices;
extracting a sub-graph associated with the requesting microservice;
creating one or more data-driven dependencies by replacing one or more values of the sub-graph with a reference link;
resolving the one or more data-driven dependencies, the resolving comprising replacing the reference link with new values from the status events; and
terminating the saga in based on the one or more data-driven dependencies being resolved.

10. The computer-implemented method of claim 9, further comprises idem potently executing business logic in response to resolving the one or more data-driven dependencies; and publishing a business logic event status on the microservice framework.

11. The computer-implemented method of claim 9, wherein the reference link is a single key-value pair, and the single key-value pair adheres to a syntax such that a key is represented by a symbol followed by an event processor name, and a value is represented by a JSON path to an element in a status event associated with an independent microservice.

12. The computer-implemented method of claim 9, wherein publishing the sub-graph schema further comprises publishing parameter requirements associated with the requesting microservice.

13. The computer-implemented method of claim 9, further comprising monitoring the microservice framework for status event receipts associated with status events of the one or more independent microservices.

14. The computer-implemented method of claim 9, wherein extracting the sub-graph, further comprises extracting the sub-graph from a supergraph with including additional sub-graphs associated with the one or more independent microservices.

15. The computer-implemented method of claim 9, wherein resolving the one or more data-driven dependencies further comprises using a unique supergraph transaction identifier locate events associated with the federated mutation request on the microservice framework.

16. The computer-implemented method of claim 10, wherein idempotently executing business logic further comprises transmitting a transaction associated with the federated mutation request from the microservice framework to an idempotent business layer.

17. A system comprising:
a server comprising one or more processors; and
a non-transitory memory, in communication with the server, storing instructions that when executed by the one or more processors, causes the one or more processors to implement a method comprising:
responsive to receiving a microservice composition request from a requesting microservice:
publishing a sub-graph schema on a microservice framework;
broadcasting a federated mutation request on the microservice framework to one or more microservices;
extracting a sub-graph associated with the requesting microservice;
creating one or more data-driven dependencies by replacing one or more values of the sub-graph with a reference link;
resolving the one or more data-driven dependencies, the resolving comprising replacing the reference link with new values from the status events; and
terminating the saga based on the one or more data-driven dependencies being resolved.

18. The system of claim 17, further comprises idempotently executing business logic in response to resolving the one or more data-driven dependencies; and publishing a business logic event status on the microservice framework.

19. The system of claim 17, wherein the reference link is a single key-value pair, and the single key-value pair adheres to a syntax such that a key is represented by a symbol followed by an event processor name, and a value is represented by a JSON path to an element in a status event associated with an independent microservice.

20. The system of claim 17, wherein publishing the sub-graph schema further comprises publishing parameter requirements associated with the requesting microservice.

* * * * *